(12) United States Patent
Zhang et al.

(10) Patent No.: US 12,471,113 B2
(45) Date of Patent: Nov. 11, 2025

(54) APPARATUS AND METHODS OF SPAN LEVEL TDM PDCCH TRANSMISSION

(71) Applicant: Lenovo (Beijing) Ltd., Beijing (CN)

(72) Inventors: Yi Zhang, Chao Yang District (CN); Chenxi Zhu, Haidian District (CN); Bingchao Liu, Changping District (CN); Wei Ling, Changping (CN); Lingling Xiao, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 532 days.

(21) Appl. No.: 18/000,391

(22) PCT Filed: Jun. 19, 2020

(86) PCT No.: PCT/CN2020/097049
§ 371 (c)(1),
(2) Date: Nov. 30, 2022

(87) PCT Pub. No.: WO2021/253383
PCT Pub. Date: Dec. 23, 2021

(65) Prior Publication Data
US 2023/0217460 A1    Jul. 6, 2023

(51) Int. Cl.
*H04B 7/06* (2006.01)
*H04L 5/00* (2006.01)
(Continued)

(52) U.S. Cl.
CPC ...... *H04W 72/232* (2023.01); *H04B 7/06952* (2023.05); *H04L 5/0053* (2013.01); *H04W 72/0446* (2013.01)

(58) Field of Classification Search
CPC ............. H04W 72/232; H04B 7/06952; H04B 7/0695
See application file for complete search history.

(56) References Cited

U.S. PATENT DOCUMENTS 10,986,622 B2 * 4/2021 Zhang .................. H04L 5/0094
2019/0230529 A1 * 7/2019 Sadiq .................... H04W 16/28
(Continued)

FOREIGN PATENT DOCUMENTS

CN    102595604 A    7/2012
CN    109121159 A    1/2019
(Continued)

OTHER PUBLICATIONS

3GPP TSG RAN WG1 Meeting#87, R1-1612191 Title: Further discussion on uplink control channel design for NR (Year: 2016).*
(Continued)

*Primary Examiner* — Faruk Hamza
*Assistant Examiner* — Abusayeed M Haque
(74) *Attorney, Agent, or Firm* — FIG. 1 Patents

(57) ABSTRACT

Apparatus and methods of span level TDM PDCCH transmission are disclosed. The apparatus includes: a receiver that receives a capability report from a device, wherein the capability report comprises Physical Downlink Control Channel (PDCCH) monitoring capability and/or beam switching capability of the device; a processor that generates PDCCH transmission parameters, based on the capability report, for transmitting a Downlink Control Information (DCI) with a plurality of PDCCH transmissions with span level repetitions; wherein the processor further configures, based on the PDCCH transmission parameters, a plurality of resources for transmitting the DCI, and a search space set for DCI detection in a PDCCH monitoring occasion set; and a transmitter that transmits the DCI in a plurality of DCI versions with the plurality of PDCCH transmissions using the plurality of resources.

20 Claims, 9 Drawing Sheets

(51) Int. Cl.
  *H04W 8/24*     (2009.01)
  *H04W 72/0446*  (2023.01)
  *H04W 72/232*   (2023.01)

(56)         References Cited

U.S. PATENT DOCUMENTS

2020/0137745 A1*  4/2020  Bachu ............... H04W 72/0453
2020/0260486 A1*  8/2020  Zhou ................ H04W 28/0278

FOREIGN PATENT DOCUMENTS

CN        110612692 A      12/2019
CN        110830216 A       2/2020
WO        2019029425 A1     2/2019
WO    WO-2019099659 A1 *    5/2019   ............ H04W 72/53

OTHER PUBLICATIONS

3GPP TSG RAN WG1 Meeting#97, R1-1905989 Title: Further discussion on the channel structure of msgA (Year: 2019).*
PCT/CN2020/097049 , "International Search Report and Written Opinion", PCT Application No. PCT/CN2020/097049, Mar. 17, 2021, 6 pages.

* cited by examiner

APPARATUS AND METHODS OF SPAN LEVEL TDM PDCCH TRANSMISSION

FIELD

The subject matter disclosed herein relates generally to wireless communication and more particularly relates to, but not limited to, apparatus and methods of span level Time-Division Multiplexing (TDM) Physical Downlink Control Channel (PDCCH) transmission.

BACKGROUND

The following abbreviations and acronyms are herewith defined, at least some of which are referred to within the specification:

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Bandwidth Part (BWP), Control Resource Set (CORESET), Downlink Control Information (DCI), enhanced Mobile Broadband (eMBB), Frequency-Division Multiplexing (FDM), Frequency Division Multiple Access (FDMA), Identification (ID), Information Element (IE), Radio Frequency (RF), Radio Resource Control (RRC), Single Frequency Network (SFN), Start and Length Indicator (SLIV), Time-Division Multiplexing (TDM), Transmit Receive Point (TRP), Ultra Reliable Low Latency Communications (URLLC), Frequency Range 1 (FR1), Frequency Range 2 (FR2), Transmission Configuration Indication (TCI), Enhanced Physical Downlink Control Channel (E-PDCCH).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs The spatial diversity may be exploited in addition to the time-frequency diversity. Enhanced Physical Downlink Control Channel (E-PDCCH) allows exploitation of the additional resources to improve PDCCH transmission reliability and robustness.

SUMMARY

Apparatus and methods of span level TDM PDCCH transmission are disclosed.

According to a first aspect, there is provided an apparatus, including: a receiver that receives a capability report from a device, wherein the capability report comprises Physical Downlink Control Channel (PDCCH) monitoring capability and/or beam switching capability of the device; a processor that generates PDCCH transmission parameters, based on the capability report, for transmitting a Downlink Control Information (DCI) with a plurality of PDCCH transmissions with span level repetitions; wherein the processor further configures, based on the PDCCH transmission parameters, a plurality of resources for transmitting the DCI, and a search space set for DCI detection in a PDCCH monitoring occasion set; and a transmitter that transmits the DCI in a plurality of DCI versions with the plurality of PDCCH transmissions using the plurality of resources.

According to a second aspect, there is provided an apparatus, including: a transmitter that transmits a capability report, wherein the capability report comprises Physical Downlink Control Channel (PDCCH) monitoring capability and/or beam switching capability of the apparatus; and a receiver that receives PDCCH transmission parameters, that are generated based on the capability report, for receiving a Downlink Control Information (DCI) from a plurality of PDCCH transmissions with span level repetitions; wherein the receiver further receives a configuration of: a plurality of resources for receiving the DCI, and a search space set for DCI detection in a PDCCH monitoring occasion set; and the receiver further receives the DCI in a plurality of DCI versions with the plurality of PDCCH transmissions from the plurality of resources.

According to a third aspect, there is provided a method, including: receiving, by a receiver, a capability report from a device, wherein the capability report comprises Physical Downlink Control Channel (PDCCH) monitoring capability and/or beam switching capability of the device; generating, by a processor, PDCCH transmission parameters, based on the capability report, for transmitting a Downlink Control Information (DCI) with a plurality of PDCCH transmissions with span level repetitions; wherein the processor further configures, based on the PDCCH transmission parameters, a plurality of resources for transmitting the DCI, and a search space set for DCI detection in a PDCCH monitoring occasion set; and transmitting, by a transmitter, the DCI in a plurality of DCI versions with the plurality of PDCCH transmissions using the plurality of resources.

According to a fourth aspect, there is provided a method, including: transmitting, by a transmitter, a capability report, wherein the capability report comprises Physical Downlink Control Channel (PDCCH) monitoring capability and/or beam switching capability; receiving, by a receiver, PDCCH transmission parameters, that are generated based on the capability report, for receiving a Downlink Control Information (DCI) from a plurality of PDCCH transmissions with span level repetitions; receiving a configuration of: a plurality of resources for receiving the DCI, and a search space set for DCI detection in a PDCCH monitoring occasion set; and receiving the DCI in a plurality of DCI versions with the plurality of PDCCH transmissions from the plurality of resources.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
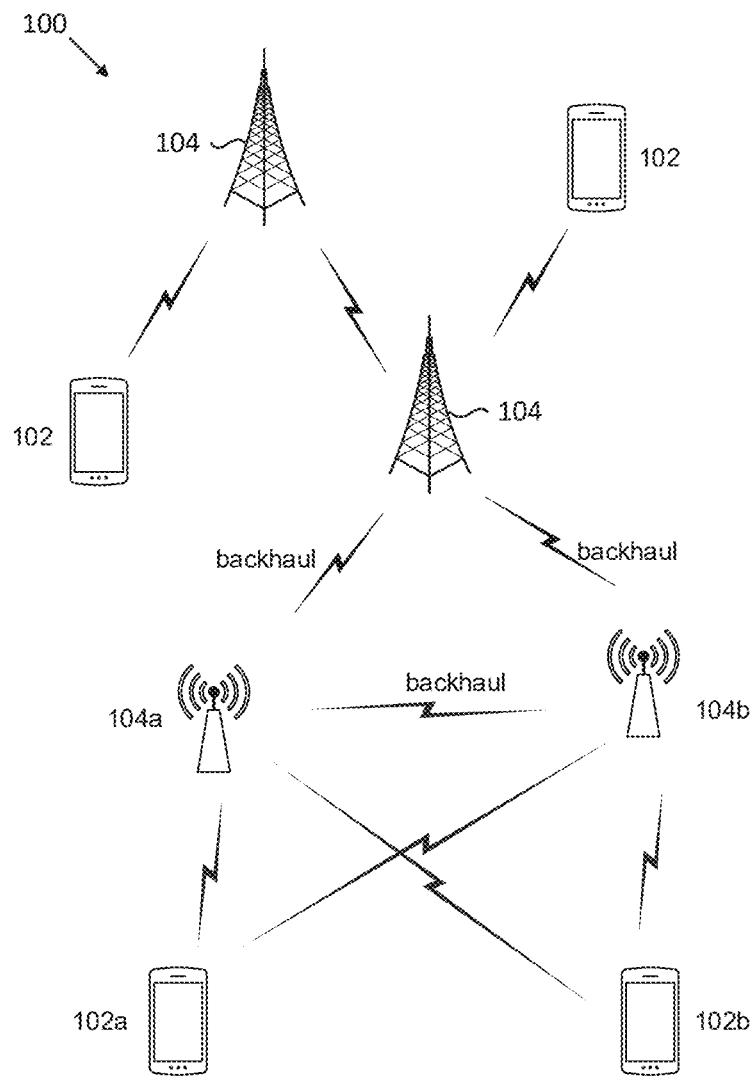
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
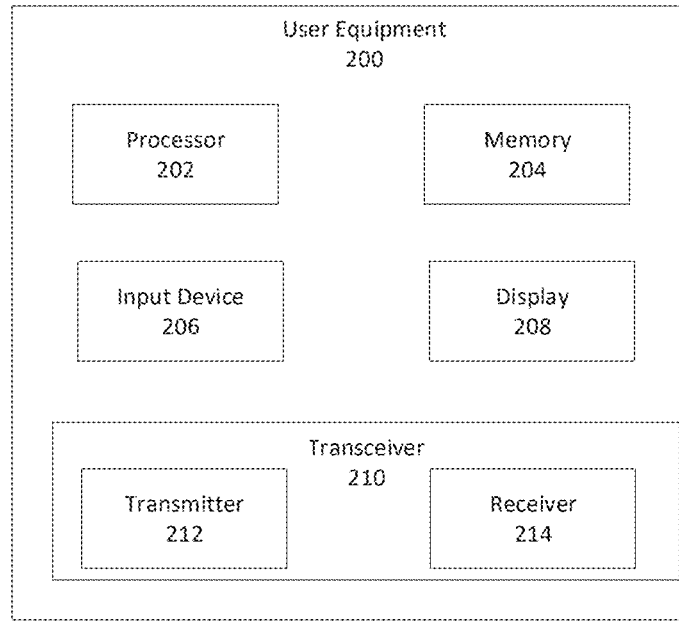
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
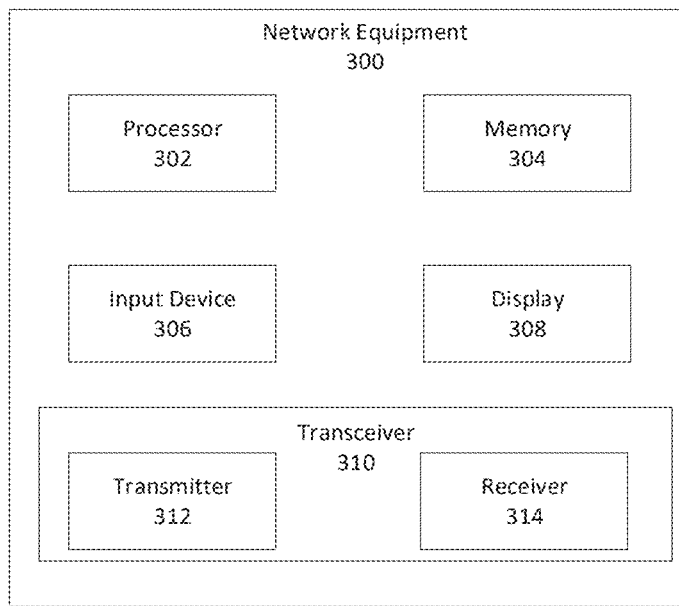
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

With multiple TRPs, time-frequency resources for PDCCH transmission may be from multiple TRPs. The spatial diversity may be exploited in addition to time-frequency diversity.

When UE has no capability to receive PDCCH from multiple different beams/TRPs simultaneously, spatial division multiplexing (SDM) and frequency division multiplexing (FDM) schemes with PDCCH transmission from multiple TRPs are not possible. Thus, Time Division Multiplexing (TDM) schemes may be used to improve PDCCH reliability, especially for single panel UE for FR2 and 1Rx (One Receiver) UE for FR1.

Besides slot level TDM scheme, span level TDM scheme may be another option. It achieves not only good reliability but also better latency on account of smaller time unit for repetition transmission. However, it has higher requirement for UE PDCCH monitoring capability. In detail, one DCI may be transmitted with multiple times of repetition (or with multiple versions) from multiple TRPs in a slot, where each version is transmitted in one occasion in the slot.

PDCCH may be supported by single TRP transmission or multiple TRP transmission similar as Single Frequency Network (SFN) transmission. For span level TDM PDCCH transmission from multiple TRPs, multiple PDCCH transmissions with repetition are transmitted from multiple spans in a slot. The span for PDCCH transmission may be defined and the supported span number may be related with UE capability. Based on available spans for PDCCH transmission, the supported transmission scheme may be further determined. Furthermore, span level and slot level may be combined together for large number of repetitions with smaller delay relative to slot level only TDM transmission scheme.

For conventional PDCCH, one monitoring occasion is used for one DCI detection. However, multiple monitoring occasions or a monitoring occasion set in multiple spans are required for one DCI detection when multiple PDCCH transmission versions from multiple spans are used for one DCI transmission.

In Release 16, single-DCI based span (i.e. mini-slot) level PDSCH transmission with multiple TRPs is specified. In this transmission scheme, the number of transmission occasions is implicitly determined by the number of TCI states indicated by a code point whereas one TCI state means one transmission occasion and two states means two transmission occasions. The starting symbol of the second transmission occasion has K symbol offset relative to the last symbol of the first transmission occasion, whereas the value of K can be optionally configured by RRC with candidate values 0~7. If not configured, K=0. The starting symbol and length of the first transmission occasion is indicated by SLIV (Start and Length Indicator) and the length of the second transmission occasion is the same as the first transmission occasion. The scheme is specified in TS38.214 as follows:

When a UE is configured by the higher layer parameter RepSchemeEnabler set to 'TDMSchemeA' and indicated DM-RS port(s) within one CDM group in the DCI field "Antenna Port(s)", the number of PDSCH transmission occasions is derived by the number of TCI states indicated by the DCI field 'Transmission Configuration Indication' of the scheduling DCI.

- If two TCI states are indicated by the DCI field 'Transmission Configuration Indication', the UE is expected to receive two PDSCH transmission occasions, where the first TCI state is applied to the first PDSCH transmission occasion and resource allocation in time domain for the first PDSCH transmission occasion follows Clause 5.1.2.1. The second TCI state is applied to the second PDSCH transmission occasion, and the second PDSCH transmission occasion shall have the same number of symbols as the first PDSCH transmission occasion. If the UE is configured by the higher layers with a value $\overline{K}$ in StartingSymbolOffsetK, it shall determine that the first symbol of the second PDSCH transmission occasion starts after $\overline{K}$ symbols from the last symbol of the first PDSCH transmission occasion. If the value $\overline{K}$ is not configured via the higher layer parameter StartingSymbolOffsetK, $\overline{K} = 0$ shall be assumed by the UE. The UE is not expected to receive more than two PDSCH transmission layers for each PDSCH transmission occasion. For two PDSCH transmission occasions, the redundancy version to be applied is derived according to Table 5.1.2.1-2, where n = 0,1 applied respectively to the first and second TCI state.
- Otherwise, the UE is expected to receive a single PDSCH transmission occasion, and the resource allocation in the time domain follows Clause 5.1.2.1.

Thus, for single DCI based multiple TRP span level PDSCH transmission, only two transmission occasions are supported and TCI state indication for each transmission occasion and symbol level offset between two transmission occasions are specified in Release 16.

In current NR system, UE capability on beam switching is defined by maxNumberRxTxBeamSwitchDL, which defines the number of Tx and Rx beam changes UE can perform within a slot across all configured serving cells and is a BandNR parameter. UE shall report one value per each subcarrier spacing supported by the UE. The candidate values are defined in TS38.311 as follows:

```
maxNumberRxTxBeamSwitchDL    SEQUENCE {
    scs-15kHz    ENUMERATED {n4, n7, n14}    OPTIONAL,
    scs-30kHz    ENUMERATED {n4, n7, n14}    OPTIONAL,
    scs-60kHz    ENUMERATED {n4, n7, n14}    OPTIONAL,
    scs-120kHz   ENUMERATED {n4, n7, n14}    OPTIONAL,
    scs-240kHz   ENUMERATED {n4, n7, n14}    OPTIONAL
}
```

Based on the current UE capability, 4/7/14 times of receive beam switching in a slot across all configured cells/carriers may be supported by UE capability for FR2. In other words, all UE can support 4 times of beam switching in a slot across all configured cells/carriers.

For Release 16 URLLC enhancement, a capability, i.e. per span based capability, is defined for PDCCH monitoring on a serving cell. The definition for span pattern is shown as follows in TS38.213. A UE capability for PDCCH monitoring per span on an active DL BWP of a serving cell is defined by a maximum number of PDCCH candidates and non-overlapped CCEs the UE can monitor per span, respectively, on the active DL BWP of the serving cell.

> A span pattern is a time configuration within a slot and per slot for PDCCH monitoring on an active DL BWP of a serving cell. A span pattern is defined by a pair of numbers of symbols (X, Y) with X ≥ Y. X is a minimum number of consecutive symbols between first symbols of two PDCCH monitoring occasions in two respective consecutive span patterns and defines a span, and Y is a number of consecutive symbols for PDCCH monitoring occasions within the X symbols, starting from the first symbol of the X symbols, and defines a span gap.
> If a UE is provided PDCCHMonitoringCapabilityConfig for a serving cell, the UE obtains an indication to monitor PDCCH on the serving cell for a maximum number of PDCCH candidates and non-overlapping CCEs
> - per slot, as in Tables 10.1-2 and 10.1-3, if PDCCHMornitoringCapabilityConfig = R15 PDCCH monitoring capability, or
> - per span, as in Tables 10.1-2A and 10.1-3A, if PDCCHMornitoringCapabilityConfig = R16 PDCCH monitoring capability Latency may be reduced with span level scheduling, where PDSCH is scheduled by a DCI transmitted in one PDCCH monitoring occasion of a span.

The Information Element (IE) SearchSpace defines how and/or where to search for PDCCH candidates, where each search space set is associated with one ControlResourceSet. Time domain behavior for monitoring is defined by parameters monitoringSlotPeriodicityAndOffset, duration and monitoringSymbolsWithinSlot. For monitoringSymbolsWithinSlot, it defines the first symbol(s) for PDCCH monitoring in the slots configured for PDCCH monitoring (see monitoringSlotPeriodicityAndOffset and duration). The most significant (left) bit represents the first OFDM in a slot, and the second most significant (left) bit represents the second OFDM symbol in a slot and so on. The bit(s) set to one identify the first OFDM symbol(s) of the control resource set within a slot. The related SearchSpace information element in TS 38.331 is described as follows.

```
SearchSpace ::=                          SEQUENCE {
    searchSpaceId                        SearchSpaceId,
    controlResourceSetId                 ControlResourceSetId
                                         OPTIONAL,   -- Cond SetupOnly
    monitoringSlotPeriodicityAndOffset   CHOICE {
        s11                              NULL,
        s12                              INTEGER (0..1),
        ...
    }
                                         OPTIONAL,   -- Cond Setup
    duration                             INTEGER (2..2559)
                                         OPTIONAL,   -- Need R
    monitoringSymbolsWithinSlot          BIT STRING (SIZE (14))
                                         OPTIONAL,   -- Cond Setup
    nrofCandidates                       SEQUENCE {
        aggregationLevel1                ENUMERATED {n0, n1, n2, n3, n4, n5, n6, n8},
        aggregationLevel2                ENUMERATED {n0, n1, n2, n3, n4, n5, n6, n8},
        aggregationLevel4                ENUMERATED {n0, n1, n2, n3, n4, n5, n6, n8},
```

```
        aggregationLevel8            ENUMERATED {n0, n1, n2, n3, n4, n5, n6, n8},
        aggregationLevel16           ENUMERATED {n0, n1, n2, n3, n4, n5, n6, n8}
      }
  OPTIONAL,   -- Cond Setup
    searchSpaceType                  CHOICE {
      common                            SEQUENCE {
        ...
  OPTIONAL,   -- Need R
      },
      ue-Specific                       SEQUENCE {
        dci-Formats                        ENUMERATED {formats0-0-And-1-0, formats0-1-And-1-1},
        ...
      }
    }
  OPTIONAL    -- Cond Setup
}
```

The start symbol(s) for PDCCH monitoring in a slot is defined by parameter monitoringSymbolsWithinSlot. One DCI is detected from one monitoring occasion in a search space set.

In some examples, span level time division multiplexing (TDM) PDCCH transmission schemes with multiple beams from multiple TRPs are discussed. The transmission schemes may be designed on account of UE's reported PDCCH monitoring capability and multiplexing efficiency with PDSCH for eMBB and URLLC UEs.

The related configuration parameters for transmission schemes, e.g. TCI indication and repetition number, may be provided. At the receive side, DCI blind detection may be based on the PDCCH monitoring occasion set which may include one or multiple slots with multiple occasions in one slot.

To support large repetition number with relatively small latency, span level TDM scheme could be used in combination with slot level TDM scheme.

Figure 4:
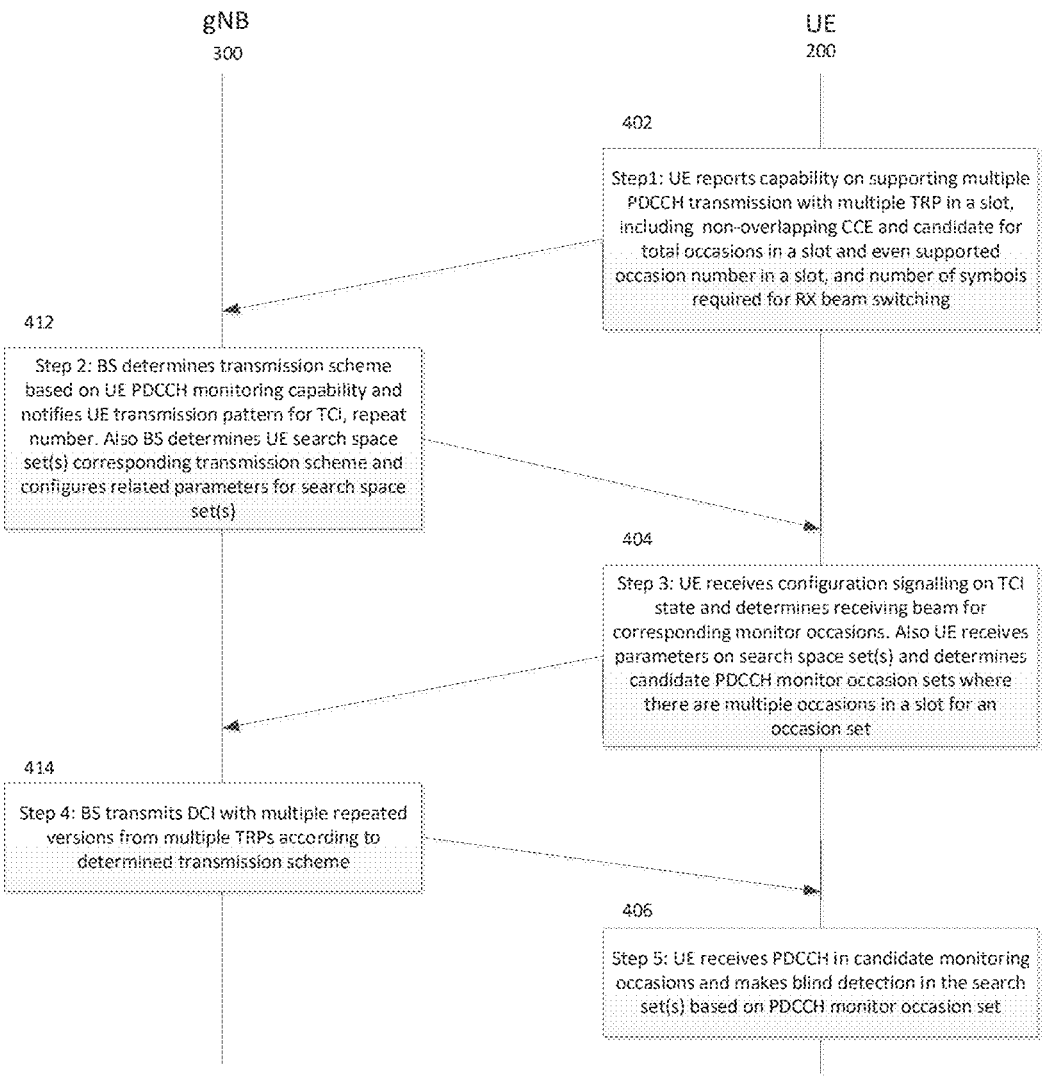
FIG. 4 is a schematic block diagram illustrating an exemplary procedure for span level TDM PDCCH transmission with multiple TRPs in accordance with some implementations of the present disclosure.

FIG. 4 is a schematic block diagram illustrating an exemplary procedure for span level TDM PDCCH transmission with multiple TRPs in accordance with some implementations of the present disclosure.

In step 402, UE 200 reports capability on supporting multiple PDCCH transmissions with multiple TRPs in a slot (i.e. PDCCH monitoring capability), including non-overlapping CCEs and PDCCH candidates for total occasions in a slot and supported occasion number in a slot, and number of symbols required for RX beam switching (i.e. beam switching capability).

In step 412, gNB 300 determines the transmission scheme based on UE PDCCH monitoring capability, and notifies UE the transmission pattern for TCI state and the repeat number. The gNB 300 also determines UE search space set(s) corresponding the transmission scheme and configures related parameters for search space set(s). That is, the gNB 300 determines PDCCH transmission parameters for transmitting a DCI with span level TDM PDCCH transmission based on the UE capability report.

In step 404, the UE 200 receives configuration signalling on TCI state and determines receiving beam for corresponding monitoring occasions. The UE 200 also receives parameters on search space set(s) and determines candidate PDCCH monitoring occasion sets where there are multiple occasions in a slot for a monitoring occasion set.

In step 414, the gNB 300 transmits DCI with multiple repeated versions from multiple TRPs according to determined transmission scheme.

In step 406, the UE 200 receives PDCCH in candidate monitoring occasions and makes blind detection in the search space set(s) based on PDCCH monitor occasion set.

Figure 5A:
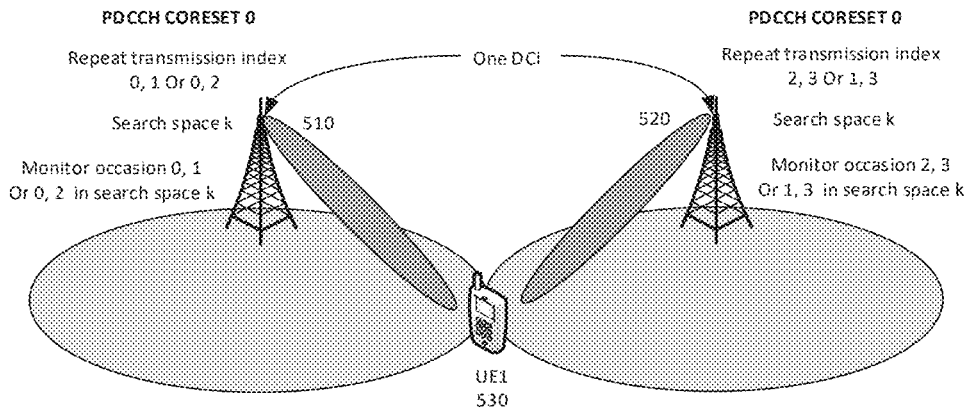
FIGS. 5A and 5B are schematic diagrams illustrating exemplary systems of span level TDM PDCCH transmission with multiple TRPs in accordance with some implementations of the present disclosure.
Figure 5B:
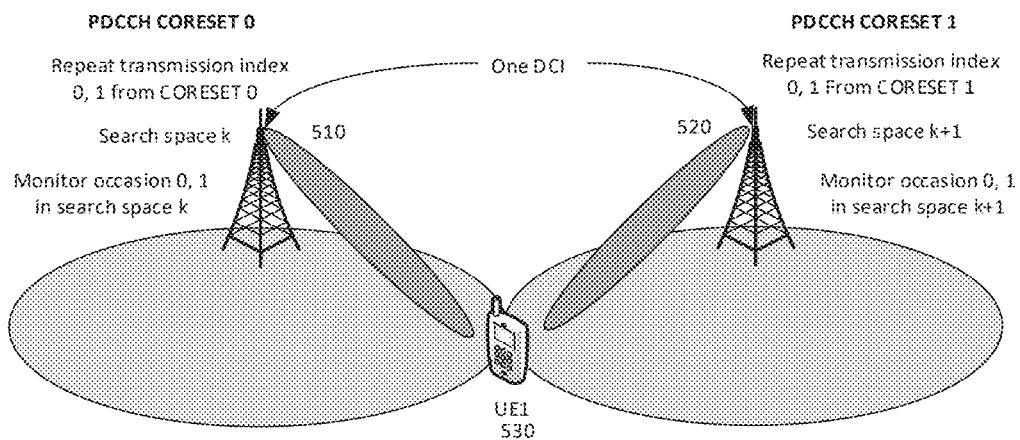

Two exemplary systems of span level TDM PDCCH transmission with multiple TRPs are shown in FIGS. 5A and 5B. One DCI is transmitted with multiple times of repeat transmission from multiple TRPs 510, 520 to UE 530 with each repeat transmission monitored on one PDCCH monitoring occasion. PDCCH monitoring occasions may be defined in span level with multiple spans in a slot.

Based on the actual application scenario, one or more CORESETs may be configured for PDCCH transmission. For case of one CORESET configuration as shown in FIG. 5A with CORESET 0 only, multiple times of DCI repetition are transmitted in multiple monitoring occasions in one search space set (search space k). For case of multiple CORESETs configuration as shown in FIG. 5B with CORESET 0 and CORESET 1, multiple times of DCI repetition are transmitted in multiple monitoring occasions in multiple search space sets (search space k and search space k+1).

UE Capability Report on PDCCH Monitoring

UE capability for PDCCH monitoring per slot or per span on an active DL BWP of a serving cell may be defined by a maximum number of PDCCH candidates and non-overlapped CCEs the UE can monitor per slot or per span, respectively, on the active DL BWP of the serving cell. For UE monitoring PDCCH for eMBB, Release 15 capability, i.e. per slot based PDCCH monitoring capability, may be used. For UE monitoring PDCCH for URLLC, Release 16 capability, i.e. per span based PDCCH monitoring capability, may be used. For UE supporting enhanced PDCCH transmission with multiple repetitions, the UE can decode a same DCI based on multiple transmissions. A new PDCCH monitoring capability may be used, which may be referred to as Release 17 PDCCH monitoring capability. UE may report to gNB the supported PDCCH monitoring capability, namely, Release 15 PDCCH monitoring capability, Release 16 PDCCH monitoring capability, or Release 17 PDCCH monitoring capability.

To support different span level PDCCH transmission schemes with multiple beams from multiple TRPs, different UE PDCCH monitoring capabilities are needed. Thus, a transmission scheme may be not configured if its required PDCCH monitoring capability exceeds UE's reported PDCCH monitoring capability.

For example, for a UE reporting Release 15 PDCCH monitoring capability, it can support a maximum of 32 non-overlapped CCEs and 20 PDCCH candidates per slot per BWP with subcarrier space 120 KHz. When 96 PRBs with duration 1 or 48 PRBs with duration 2 are configured in a CORESET, it includes 16 non-overlapped CCEs. Thus, it can support 2 PDCCH monitoring occasions based on the ability of supporting 32 non-overlapping CCEs.

For PDCCH candidates, it may be configured with only small candidate number for high aggregation level to improve reliability. For example, 0 candidate for aggregation level 2/1, and 1/2/4 candidates for aggregation level 16/8/4. Thus, it may support 2 PDCCH monitoring occasions based on the ability of supporting 20 candidates.

Thus, transmission schemes with only a small number of PDCCH monitoring occasions in a slot, e.g. 2, may be configured for UEs with Release 15 PDCCH monitoring capability. Transmission schemes with only a relative large number of PDCCH monitoring occasions in a monitoring occasion set, e.g. 4, may be configured for UEs with Release 16 or Release 17 PDCCH monitoring capability.

In addition to PDCCH monitoring capability, there is UE capability on beam switching number in one slot across all serving cells/carriers (i.e. beam switching capability), which is defined by maxNumberRxTxBeamSwitchDL. For FR2 UE, number 4/7/14 (i.e. one of candidate values {4, 7, 14}) may be reported. The total beam switching number for multiple versions of PDCCH transmission cannot exceed this number. It may require a relatively higher ability for UE to support receiving consecutive PDCCH transmissions with different transmit beams, since it may require a little time to adjust its RF parameters to generate corresponding receiving beam. Thus, UE needs to report this capability for gNB to determine/configure a suitable pattern.

Thus, the following capabilities of UE on PDCCH reception are required to be reported to gNB:
 a) PDCCH monitoring capability defined by PDCCH-MonitoringCapabilityConfig. The candidate values may include {R15 PDCCH monitoring capability, R16 PDCCH monitoring capability, R17 PDCCH monitoring capability}. Here, number of non-overlapping CCEs and number of PDCCH monitoring occasions are defined separately for R15/R16/R17 PDCCH monitoring capability on account of different blind detection complexity and time requirement. Furthermore, the supported maximum number of PDCCH monitoring occasions may be also additionally included in the definition of R15/R16/R17 PDCCH monitoring capability.
 b) Beam switching capability defined by maxNumberRxTxBeamSwitchDL and additional parameter.
  The maximum total Tx and Rx beam switching number in a slot is defined. The candidate values may include {4, 7, 14}. Furthermore, the number of OFDM symbols as gap for beam switching may be defined additionally by parameter SymbolGapBeamswitching. The candidate values may include 10, 11.

Span Level TDM Transmission Schemes

To determine span level PDCCH transmission scheme with multiple beams from multiple TRPs, the following principles may be considered:
 a) The used PDCCH transmission opportunity number, i.e. monitoring occasion number, in a slot cannot exceed the reported UE PDCCH monitoring capability;
 b) The total required repeat number depends on channel quality and a large repeat number may be used to guarantee performance requirement for reliable PDCCH transmission;
 c) Generally, PDCCH and PDSCH can be multiplexed for transmission in a slot. If there are too many segments in the time domain for PDCCH transmission, it may cause multiple non-continuous symbols for PDSCH transmission. Thus, this may cause fragment issues on account of consecutive OFDM symbols for scheduling and resource allocation, and degrade transmission efficiency. For multiplexing with eMBB users, fragment number may be reduced as much as possible to reduce resource waste and improve PDSCH multiplexing efficiency and thus spectrum efficiency for PDSCH transmission. In this case, the space or interval (i.e. symbol offset value) between starting symbols of adjacent spans equals to the CORESET duration. For multiplexing with URLLC users, multiple spans in a slot may be compatible with the current URLLC design. That is, multiple non-consecutive spans may be almost evenly distributed in a slot and the space between starting symbols of adjacent non-consecutive spans may be 7/4/3/2 symbols;
 d) There is no overlapping in the time domain between PDCCH monitoring occasions in a PDCCH monitoring occasion set to reduce realization complexity and eliminate possible simultaneous receiving for multiple transmit beams;
 e) The beam switching number in a slot should not exceed UE capability reported by maxNumberRxTxBeamSwitchDL and beam switching for consecutive spans is not permitted if UE reports capability with non-zero symbols as gap for beam switching.

Figure 6A:
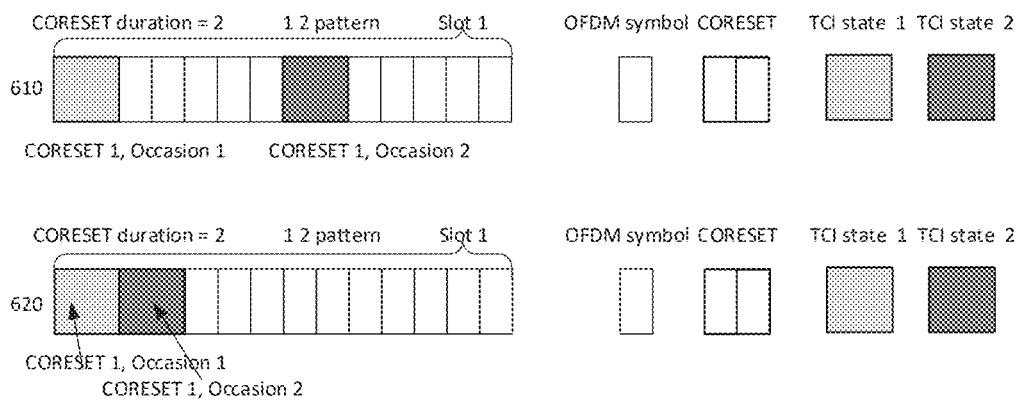
FIG. 6A is a schematic diagram illustrating examples of transmission scheme configuration of single CORESET with multiple TCI states in accordance with some implementations of the present disclosure.
Figure 6B:
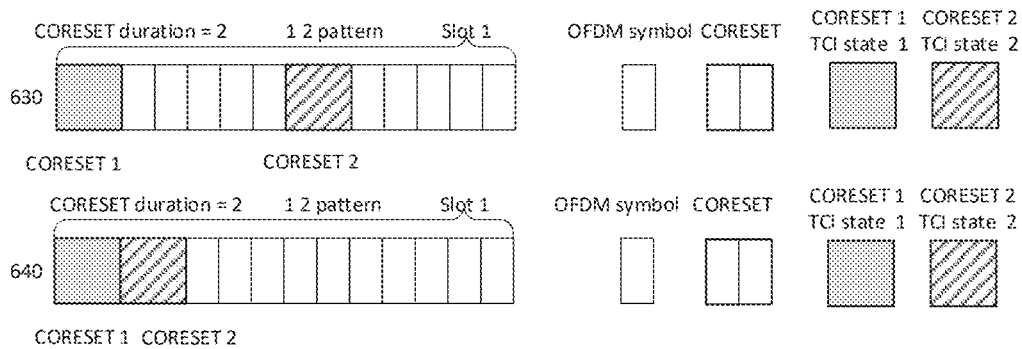
FIG. 6B is a schematic diagram illustrating examples of transmission scheme configuration of multiple CORESETs with single TCI state for each CORESET in accordance with some implementations of the present disclosure.

Examples of span level TDM transmission schemes based on these principles are illustrated in FIGS. 6A and 6B for UEs supporting a low PDCCH monitoring capability. FIG. 6A is a schematic diagram illustrating examples of transmission scheme configuration of single CORESET with multiple TCI states in accordance with some implementations of the present disclosure; and FIG. 6B is a schematic diagram illustrating examples of transmission scheme configuration of multiple CORESETs with single TCI state for each CORESET in accordance with some implementations of the present disclosure.

The transmission schemes illustrated in FIG. 6A (Case A) and FIG. 6B (Case B) are similar in principle but with different configurations on CORESET and its TCI state(s). Two patterns 610 and 620 are shown for Case A and two patterns 630 and 640 are shown for Case B. For single CORESET configuration as shown in FIG. 6A, PDCCH transmissions with repetition are from a single CORESET (CORESET 1) with multiple TCI states (TCI state 1 and TCI state 2). For multiple CORESETs configuration as shown in FIG. 6B, PDCCH transmissions with repetition are from multiple CORESETs (CORESET 1 and CORESET 2) with one TCI state for each CORESET (TCI state 1 for CORESET 1 and TCI state 2 for CORESET 2). In these examples, only 2 PDCCH monitoring occasions (Occasion 1 and Occasion 2) in a slot (Slot 1) can be supported in view of UE PDCCH monitoring capability and the total repeat number is 2 based on performance requirement for reliability. For patterns 610 and 630 of Case A and Case B, two PDCCH monitoring occasions are in two spans (i.e., shaded regions) which are distributed evenly in the slot having 14 symbols and the space between starting symbols of two spans is 7 symbols. This is compatible with the current PDCCH span design for URLLC and is also friendly to PDSCH multiplexing with URLLC UEs. The space between the first OFDM symbols of two spans may be 2, 4 and 7 symbols. It shall be no smaller than the duration of CORESET (e.g. the CORESET duration is two symbols in both FIGS. 6A and 6B) to avoid time domain overlapping for PDCCH monitor occasions. In patterns 620 and 640 of Case A and Case B, two PDCCH monitoring occasions are consecutive and realized by two consecutive spans (i.e., shaded regions). Thus, the fragment issue is avoided. It is friendly to PDSCH multiplexing with eMBB UEs. However, the patterns 620 and 640 require UE to support beam switching in consecutive OFDM symbols. In these examples, two TCI states (TCI state 1 and TCI state 2) are alternatively used in two PDCCH transmission opportunities linked with two PDCCH monitor occasions. For single CORESET configuration shown in FIG. 6A, two TCI states are alternatively used for PDCCH transmission opportunities. For multiple CORESETs configuration shown in FIG. 6B, PDCCHs are transmitted alternatively from CORESETs, and two TCI state are alternatively used for PDCCH transmission opportunities.

Figure 7:
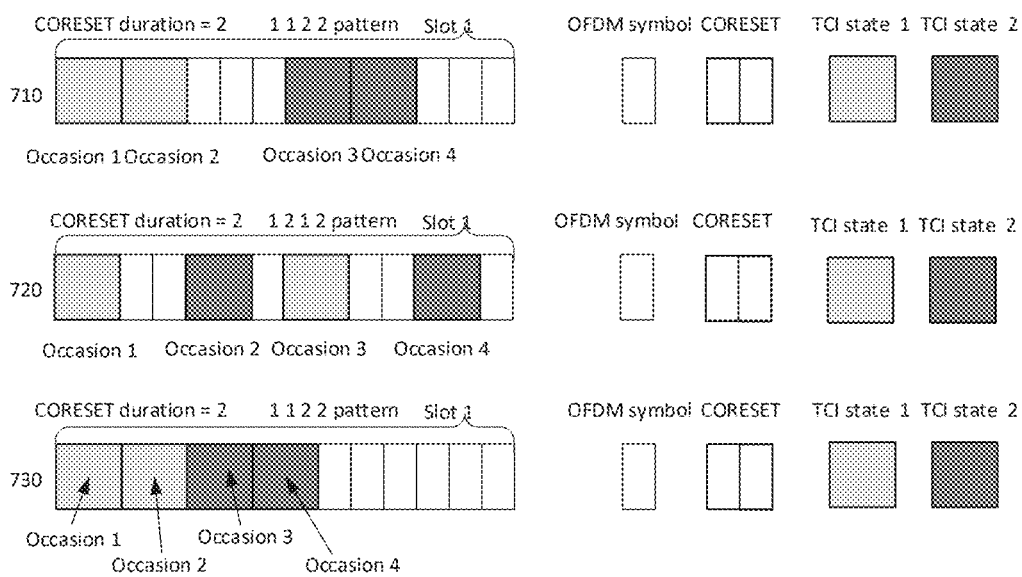
FIG. 7 is a schematic diagram illustrating examples of transmission scheme for UEs supporting a high PDCCH monitoring capability with single CORESET configuration in accordance with some implementations of the present disclosure.

Some further examples of span level TDM transmission schemes base on the abovementioned principles are illustrated in FIG. 7 for UEs supporting a high PDCCH monitoring capability with single CORESET configuration. In this example, 4 PDCCH monitoring occasions (Occasions 1, 2, 3 and 4) in a slot (Slot 1) can be supported in view of UE PDCCH monitoring capability and the total repeat number is 4 based on performance requirement for reliability. Three exemplary patterns 710, 720, 730 are shown in FIG. 7. In pattern 710, 2 span sets with 2 consecutive spans in a span set are distributed evenly in the slot (Slot 1) and the space between starting symbols of two non-consecutive spans is 7 OFDM symbols. For two consecutive spans in a span set (e.g. the two spans for Occasions 1 and 2 in pattern 710), the corresponding 2 times of PDCCH with repetition are transmitted with the same beam, i.e. TCI state (e.g. TCI state 1 for Occasions 1 and 2). This is compatible with the current PDCCH span design for URLLC and is friendly to PDSCH multiplexing with URLLC UEs. The space between the first OFDM symbols of two non-adjacent spans may be 4 and 7 symbols on account of possible 1 or 2 symbol CORESET duration (i.e. CORESET duration may be 1 or 2 symbols). And it shall be no smaller than twice of CORESET duration to avoid overlapping of PDCCH monitoring occasions in the time domain. For pattern 720, four spans are distributed almost evenly in the slot and the space between the starting symbols of two adjacent spans is 4 or 3. For example, the space is 4 symbols between the first and second spans (Occasions 1 and 2), and is 3 symbols between the second and third spans (Occasions 2 and 3). It is friendly to PDSCH multiplexing with URLLC UEs but not so friendly to PDSCH multiplexing with eMBB UEs because of fragments caused by 4 spans. In pattern 730, four spans are consecutive and used for 4 times of repeat transmission. The PDCCH linked with the first two spans are transmitted with TCI state 1 and the PDCCH linked with the second two spans are transmitted with TCI state 2. The space between starting symbols of two adjacent spans is CORESET duration, which is 2 in the example. Thus, the fragment issue is avoided. It is friendly to PDSCH multiplexing with eMBB UEs. However, pattern 730 requires UE to support beam switching in consecutive OFDM symbols. For TCI state, it may be considered as alternative switching with a granularity of 1 transmission opportunity for pattern 720, or 2 transmission opportunities for patterns 710 and 730.

Combined Span Level TDM and Slot Level TDM Transmission Schemes

To support large repeat number on account of performance requirement for enhanced reliability, combined span level TDM and slot level TDM transmission schemes (i.e. combination of span level and slot level TDM transmission schemes) may be used. This may be considered as extending span TDM transmission scheme to multiple slots. In these schemes, the symbol location for PDCCH transmission opportunities in a slot may be the same as the span level TDM transmission scheme, which is determined from the pattern defined in span TDM transmission scheme. For the available transmission opportunities, TCI states may be switched based on a unit with 1/2/4 transmission opportunities.

Figure 8A:
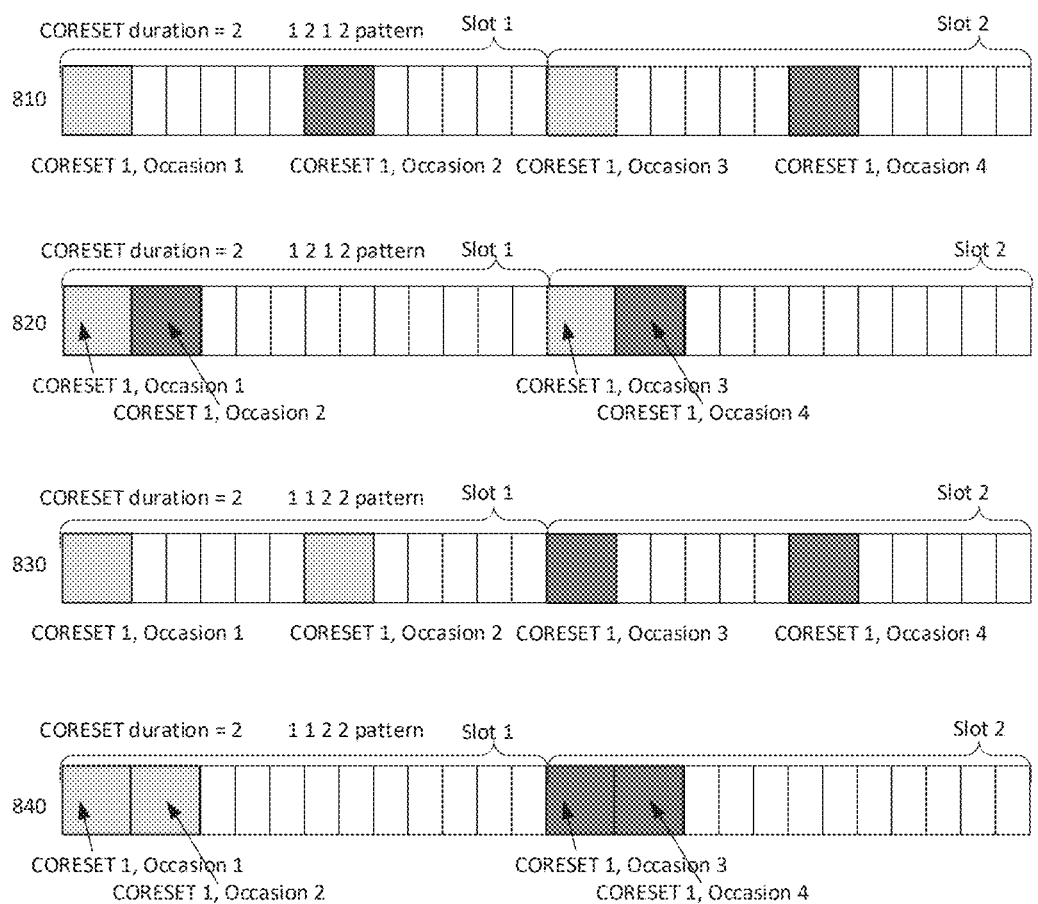
FIG. 8A is a schematic diagram illustrating examples of combined span level and slot level TDM for UEs supporting a low PDCCH monitoring capability in accordance with some implementations of the present disclosure.

FIG. 8A is a schematic diagram illustrating examples of combined span level and slot level TDM for UEs supporting a low PDCCH monitoring capability in accordance with some implementations of the present disclosure. Four exemplary patterns 810, 820, 830 and 840 are shown. In the examples, only 2 PDCCH monitoring occasions in a slot are supported in view of UE PDCCH monitoring capability and the total repeat number is 4 based on performance requirement for reliability. Pattern 810 and pattern 830 may be obtained based on transmission opportunities defined in pattern 610 in FIG. 6A by extension to two slots (Slot 1 and Slot 2 in FIG. 8A). And TCI states in patterns 810 and 830 are alternatively switched with a unit of 1 and 2 transmission opportunities, respectively. Similarly, pattern 820 and pattern 840 could be obtained based on transmission opportunities defined in pattern 620 in FIG. 6A that are extended to two slots (Slot 1 and Slot 2 in FIG. 8A). And TCI states in patterns 820 and 840 are alternatively switched with a unit of 1 and 2 transmission opportunities, respectively. Only pattern 820 needs UE to support beam switching in consecutive OFDM symbols.

Figure 8B:
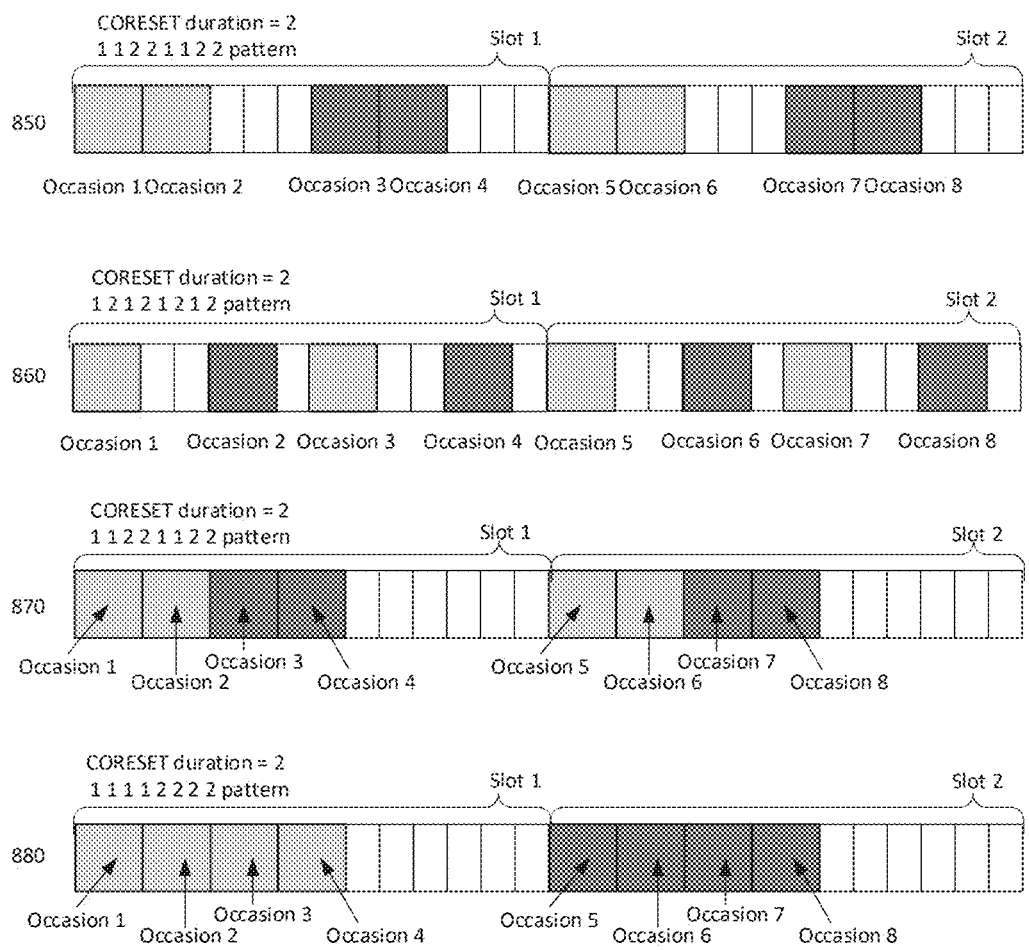
FIG. 8B is a schematic diagram illustrating examples of combined span level and slot level TDM for UEs supporting a high PDCCH monitoring capability in accordance with some implementations of the present disclosure.

FIG. 8B is a schematic diagram illustrating examples of combined span level and slot level TDM for UEs supporting a high PDCCH monitoring capability in accordance with some implementations of the present disclosure. Four exemplary patterns 850, 860, 870 and 880 are shown. In the examples, 4 PDCCH monitoring occasions in a slot can be supported in view of UE PDCCH monitoring capability and the total repeat number is 8 based on performance requirement for reliability. Patterns 850, 860 and 870 may be obtained based on transmission opportunities defined in patterns 710, 720 and 730 in FIG. 7, respectively, by extending the transmission opportunities in patterns 710, 720 and 730 to two slots. And TCI states in pattern 850 and 870 are alternatively switched with a unit of 2 transmission opportunities. Similarly, TCI states in pattern 860 and 880 are alternatively switched with a unit of 1 and 4 transmission opportunities, respectively. Only pattern 870 needs UE to support beam switching in consecutive OFDM symbols.

The span level TDM schemes, and the combined span level TDM and slot level TDM transmission schemes, may be described as a unified transmission scheme of span level TDM PDCCH transmission as follows.

a) The total repeat number (i.e. total repetition number of the PDCCH transmissions) and transmission opportunity number in a slot, i.e. the repeat number in a slot (i.e. per-slot repetition number of PDCCH transmissions), are determined based on performance requirement for reliability and UE reported PDCCH monitoring capability. They may be configured to UE for determining the PDCCH monitoring occasion set. The slot number (i.e. the number of slots) for a DCI transmission may be implicitly obtained by the quotient of the total transmission opportunity number and transmission opportunity number in a slot.

b) The transmission opportunities are determined based the designed patterns as illustrated in the earlier examples according to actual multiplexing situation, UE capability on supporting beam switching for consecutive symbols, etc. To make flexible and efficient multiplexing with PDSCH for eMBB and URLLC UEs, the space between two adjacent spans may be OFDM symbol number with one value from {CORESET duration, 2, 3, 4, 7}. Further, UE is not expected that there is overlapping in the time domain for multiple transmission opportunities for a DCI transmission. UE is also not expected PDCCH transmitted on successive OFDM symbols with different TCI states if it cannot support consecutive symbol beam switching.

c) TCI state is determined for each transmission opportunity. The TCI states may be alternatively used in multiple transmission opportunities with a possible granularity of 1/2/4 transmission opportunities. The TCI state switching granularity may be indicated to UE for determining the TCI state for each transmission opportunity.

d) The gNB transmits a DCI with multiple times of repeat transmissions on the optimized transmission opportunities as determined in b) with the TCI state as determined in c).

UE Monitoring Behavior

Since one DCI is transmitted with multiple repeat versions, the PDCCH monitoring occasion set is required to be defined for DCI detection. For span level TDM scheme, the PDCCH monitoring occasion set includes PDCCH monitoring occasions in a slot. For span level and slot level combined TDM scheme, the PDCCH monitoring occasion set includes PDCCH monitoring occasions in multiple slots, where there are multiple PDCCH monitoring occasions in a slot. The actual PDCCH monitoring occasions in a set is related to UE capability on PDCCH monitoring as described earlier.

Figure 9A:
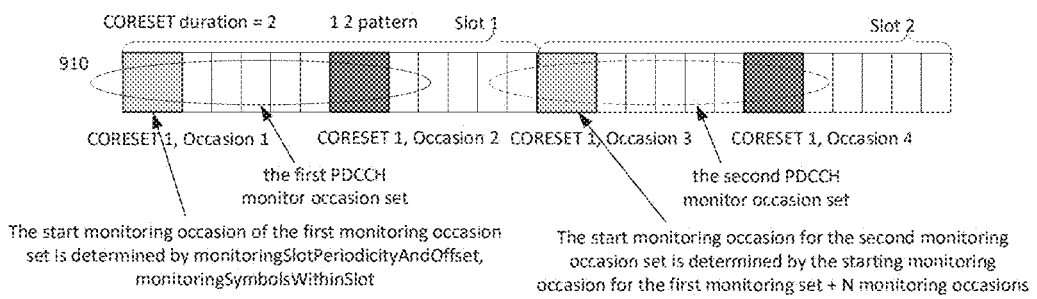
FIG. 9A is a schematic diagram illustrating an example of PDCCH monitoring occasion set in the case of one CORESET in accordance with some implementations of the present disclosure.

FIG. 9A is a schematic diagram illustrating an example of PDCCH monitoring occasion set in the case of one CORESET in accordance with some implementations of the present disclosure. In pattern 910, there are two PDCCH monitor occasion sets, the first one in Slot 1 and the second one in Slot 2. The actual location of starting symbol for each occasion in a slot may be determined by monitoringSymbolsWithinSlot. For some cases, the number of indicated starting symbol index by monitoringSymbolsWithinSlot may be equal to UE supported monitoring occasion number in a slot. And the slot with PDCCH monitoring occasions may be determined by monitoringSlotPeriodicityAndOffset, duration (e.g. CORESET duration). For the start monitoring occasions (or starting occasions) for the monitoring occasion sets, it may be determined by the first PDCCH monitoring occasion set defined by monitoringSlotPeriodicityAndOffset, and monitoringSymbolsWithinSlot, and the total repeat number, i.e. N, with a granularity of PDCCH monitoring occasions. For example, in pattern 910, the start monitoring occasion of the first monitoring occasion set is determined by monitoringSlotPeriodicityAndOffset, monitoringSymbolsWithinSlot; and the start monitoring occasion for the second monitoring occasion set is determined by the start monitoring occasion for the first monitoring set plus N monitoring occasions. The starting symbol and slot index for the first monitoring occasion set are determined as the 0-th PDCCH monitoring occasion. The starting symbol and slot index for the second monitoring occasion set is N-th PDCCH monitoring occasion and so on. Furthermore, there is no overlapping in the time domain between occasions of different PDCCH monitoring occasion sets. For PDCCH monitoring occasions in one PDCCH monitoring occasion set, it may be simply denoted by N consecutive monitoring occasions. For every monitoring occasion set, the UE makes PDCCH detection for each repeat transmission on its linked occasion based on determined/configured TCI states as described earlier.

Figure 9B:
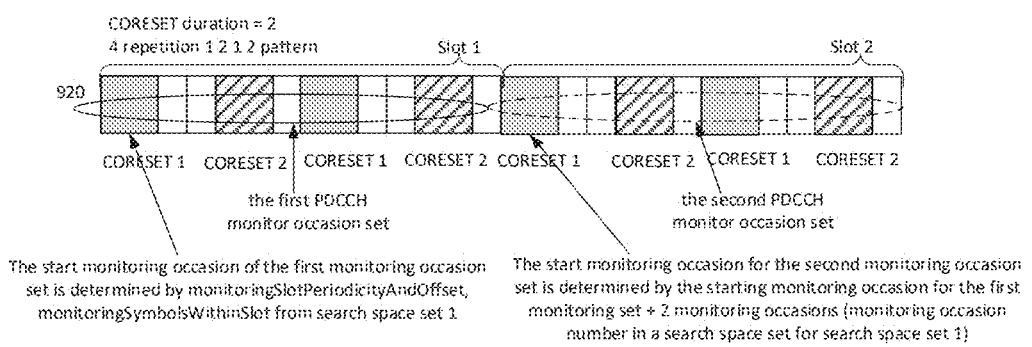
FIG. 9B is a schematic diagram illustrating an example of PDCCH monitoring occasion set in the case of multiple CORESETs in accordance with some implementations of the present disclosure.

FIG. 9B is a schematic diagram illustrating an example of PDCCH monitoring occasion set in the case of multiple CORESETs in accordance with some implementations of the present disclosure. In pattern 920, there are two PDCCH monitor occasion sets, the first one in Slot 1 and the second one in Slot 2. For multiple CORESETs configuration, the PDCCH monitoring occasion set includes multiple PDCCH monitoring occasion subsets, where each PDCCH monitoring occasion subset is from one search space set linked with one CORESET. For example, in pattern 920, the first PDCCH monitor occasion set includes two PDCCH monitoring occasion subsets: one from the search space set linked with CORESET 1 and one from the search space set linked with CORESET 2. For each search space set, separate PDCCH monitoring occasions are obtained by its search space set configuration parameters monitoringSlotPeriodicityandOffset, duration and monitoringSymbolsWithinSlot. The starting occasions of the PDCCH monitoring occasion set are from the first PDCCH monitoring occasion subset whose corresponding search space is linked with the first CORESET of the multiple configured CORESETs or the CORESET with the smallest index. For starting occasions in each monitoring occasion subset, it may be determined by its corresponding starting occasion defined by monitoringSlotPeriodicityAndOffset, monitoringSymbolsWithinSlot and repeat number in the corresponding search space set with PDCCH monitoring occasion as granularity, which is similar as the single CORESET configuration case as illustrated in FIG. 9A. For example, in pattern 920, the start monitoring occasion of the first monitoring occasion set is determined by monitoringSlotPeriodicityAndOffset, monitoringSymbolsWithinSlot from search space set 1 associated with CORESET 1; and the start monitoring occasion for the second monitoring occasion set is determined by the start monitoring occasion for the first monitoring set plus 2 monitoring occasions (monitoring occasion number in a search space set for search space set 1). As a simple scheme, PDCCH monitoring occasion subset includes consecutive monitoring occasions with number as its corresponding repeat number, e.g. the total repeat number divided by search space set number. To reduce decoding complexity and eliminate the possibility for receiving PDCCH transmitted from multiple TRPs simultaneously, UE is not expected to be configured with time domain overlapping for PDCCH monitoring occasions from one PDCCH monitoring occasion set. And, same period, same slot offset and duration are configured for each search space set. On account of easy and efficient multiplexing with PDSCH of eMBB or URLLC UEs, OFDM symbol space between starting occasions in a PDCCH monitoring occasion subset linked with different search space sets is expected to be configured/set as a value from {CORESET duration, 2, 3, 4, 7}.

Figure 10:
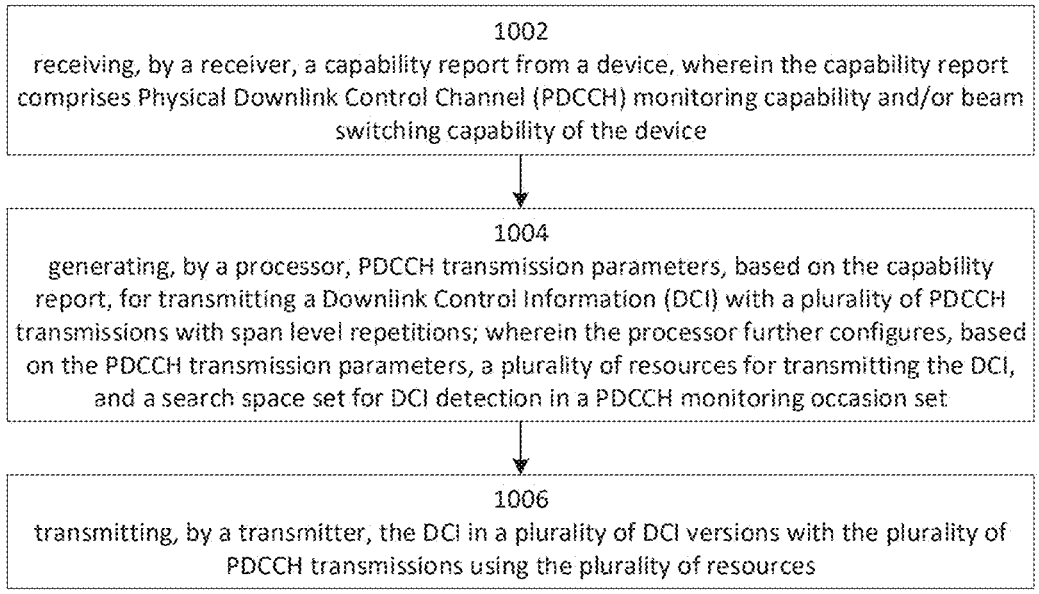
FIG. 10 is a flow chart illustrating steps of span level TDM PDCCH multiple transmissions by NE in accordance with some implementations of the present disclosure.

FIG. 10 is a flow chart illustrating steps of span level TDM PDCCH multiple transmissions by NE in accordance with some implementations of the present disclosure.

At step 1002, the receiver 314 of NE 300 receives a capability report from a device (e.g. UE), where the capability report includes Physical Downlink Control Channel (PDCCH) monitoring capability and/or beam switching capability of the device.

At step 1004, the processor 302 of NE 300 generates PDCCH transmission parameters, based on the capability report, for transmitting a Downlink Control Information (DCI) with a plurality of PDCCH transmissions with span level repetitions; and the processor 302 further configures, based on the PDCCH transmission parameters, a plurality of resources for transmitting the DCI, and a search space set for DCI detection in a PDCCH monitoring occasion set.

At step 1006, the transmitter 312 of NE 300 transmits the DCI in a plurality of DCI versions with the plurality of PDCCH transmissions using the plurality of resources.

The PDCCH transmission parameters may include a total repetition number of the PDCCH transmissions, a per-slot repetition number of PDCCH transmissions in a slot determined based on the PDCCH monitoring capability, a symbol offset value between two adjacent spans which may be at least one or a combination of: CORESET duration, 2, 3, 4, and 7, and/or a transmission opportunity number indicating a granularity of TCI state switching.

The transmitter 312 of NE 300 may transmit the DCI versions with TCI states determined implicitly by a pre-defined process based on the transmission opportunity number.

Upon determining that the beam switching capability indicates non-support of beam switching between successive symbols, the PDCCH transmission parameters may prevent transmission of the DCI versions with successive OFDM symbols with different TCI states.

The processor 302 may configure a plurality of search space sets in the PDCCH monitoring occasion set; and the PDCCH monitoring occasion set may include a plurality of PDCCH monitoring occasions in one or more PDCCH monitoring occasion subsets, each of the PDCCH monitoring occasion subsets being linked with a search space set.

A starting occasion for a candidate PDCCH monitoring occasion set may be determined by a starting occasion of a search space and a total repetition number of the PDCCH transmissions as granularity.

A starting occasion for a candidate PDCCH monitoring occasion set may be determined from a search space set that is linked with a Control Resource Set (CORESET) having a smallest CORESET index or Control Resource Set Pool (CORESETPool) index.

An interval between two adjacent starting occasions of two PDCCH monitoring occasion subsets, that are linked with different search space sets, may be expected to be configured or implicitly set as a value of: CORESET duration, 2, 3, 4, or 7 symbols.

The PDCCH monitoring occasions from one PDCCH monitoring set may not be expected to be configured with time domain overlapping.

Figure 11:
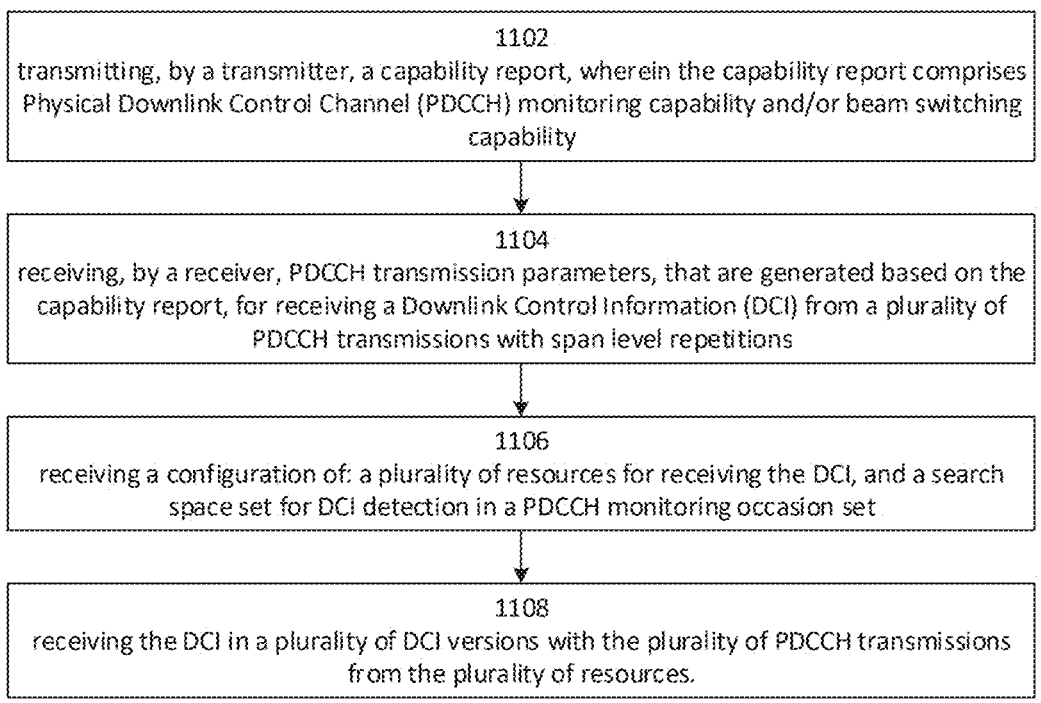
FIG. 11 is a flow chart illustrating steps of span level TDM PDCCH multiple transmissions by UE in accordance with some implementations of the present disclosure.

FIG. 11 is a flow chart illustrating steps of span level TDM PDCCH multiple transmissions by UE in accordance with some implementations of the present disclosure.

At step 1102, the transmitter 212 of UE 200 transmits a capability report, where the capability report comprises Physical Downlink Control Channel (PDCCH) monitoring capability and/or beam switching capability of the UE 200.

At step 1104, the receiver 214 of UE 200 receives PDCCH transmission parameters, that are generated based on the capability report, for receiving a Downlink Control Information (DCI) from a plurality of PDCCH transmissions with span level repetitions.

At step 1106, the receiver 214 of UE 200 receives a configuration of: a plurality of resources for receiving the DCI, and a search space set for DCI detection in a PDCCH monitoring occasion set.

At step 1108, the receiver 214 of UE 200 receives the DCI in a plurality of DCI versions with the plurality of PDCCH transmissions from the plurality of resources.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus, comprising:
a receiver;
a transmitter; and
a processor coupled to the receiver and the transmitter configured to cause the apparatus to:
receive a capability report from a device, wherein the capability report comprises one or both of Physical Downlink Control Channel (PDCCH) monitoring capability and beam switching capability of the device;
generate PDCCH transmission parameters, based on the capability report, for transmitting a Downlink Control Information (DCI) with a plurality of PDCCH transmissions with span level repetitions, and configure, based on the PDCCH transmission parameters, a plurality of resources for transmitting the DCI and a search space set for DCI detection in a PDCCH monitoring occasion set; and
transmit the DCI in a plurality of DCI versions with the plurality of PDCCH transmissions using the plurality of resources.

2. The apparatus of claim 1, wherein the PDCCH transmission parameters comprise a total repetition number of the PDCCH transmissions.

3. The apparatus of claim 1, wherein the PDCCH transmission parameters comprise a per-slot repetition number of PDCCH transmissions in a slot determined based on the PDCCH monitoring capability.

4. The apparatus of claim 1, wherein the PDCCH transmission parameters comprise a symbol offset value between two adjacent spans; and the symbol offset value comprises at least one or a combination of: Control Resource Set (CORESET) duration, 2, 3, 4, and 7.

5. The apparatus of claim 1, wherein the PDCCH transmission parameters comprise a transmission opportunity number indicating a granularity of Transmission Configuration Indication (TCI) state switching.

6. The apparatus of claim 1, wherein, upon determining that the beam switching capability indicates non-support of beam switching between successive symbols, the PDCCH transmission parameters prevent transmission of the DCI versions with successive Orthogonal Frequency Division Multiplexing (OFDM) symbols with different Transmission Configuration Indication (TCI) states.

7. The apparatus of claim 1, wherein the processor configures a plurality of search space sets in the PDCCH monitoring occasion set, and the PDCCH monitoring occasion set comprises a plurality of PDCCH monitoring occasions in one or more PDCCH monitoring occasion subsets, each of the PDCCH monitoring occasion subsets being linked with a search space set.

8. The apparatus of claim 5, wherein the plurality of DCI versions are transmitted with TCI states determined implicitly by a predefined process based on the transmission opportunity number.

9. The apparatus of claim 7, wherein a starting occasion for a candidate PDCCH monitoring occasion set is determined by a starting occasion of a search space and a total repetition number of the PDCCH transmissions as granularity.

10. The apparatus of claim 7, wherein a starting occasion for a candidate PDCCH monitoring occasion set is determined from a search space set that is linked with a Control Resource Set (CORESET) having a smallest CORESET index or Control Resource Set Pool (CORESETPool) index.

11. The apparatus of claim 7, wherein an interval between two adjacent starting occasions of two PDCCH monitoring occasion subsets, that are linked with different search space sets, is expected to be configured or implicitly set as a value of: Control Resource Set (CORESET) duration, 2, 3, 4, or 7 symbols.

12. The apparatus of claim 7, wherein the PDCCH monitoring occasions from one PDCCH monitoring set is not expected to be configured with time domain overlapping.

13. An apparatus, comprising:
a transmitter;
a receiver; and
a processor coupled to the transmitter and the receiver configured to cause the apparatus to:
  transmit a capability report, wherein the capability report comprises one or both of Physical Downlink Control Channel (PDCCH) monitoring capability and beam switching capability of the apparatus; and
  receive PDCCH transmission parameters, that are generated based on the capability report, for receiving a Downlink Control Information (DCI) from a plurality of PDCCH transmissions with span level repetitions;
  receive a configuration of a plurality of resources for receiving the DCI and a search space set for DCI detection in a PDCCH monitoring occasion set; and
  receive the DCI in a plurality of DCI versions with the plurality of PDCCH transmissions from the plurality of resources.

14. The apparatus of claim 13, wherein the PDCCH transmission parameters comprise a total repetition number of the PDCCH transmissions.

15. The apparatus of claim 13, wherein the PDCCH transmission parameters comprise a per-slot repetition number of PDCCH transmissions in a slot determined based on the PDCCH monitoring capability.

16. The apparatus of claim 13, wherein the PDCCH transmission parameters comprise a symbol offset value between two adjacent spans; and the symbol offset value comprises at least one or a combination of: Control Resource Set (CORESET) duration, 2, 3, 4, and 7.

17. The apparatus of claim 13, wherein the PDCCH transmission parameters comprise a transmission opportunity number indicating a granularity of Transmission Configuration Indication (TCI) state switching.

18. The apparatus of claim 13, wherein, upon determining that the beam switching capability indicates non-support of beam switching between successive symbols, the PDCCH transmission parameters prevent reception of the DCI versions with successive Orthogonal Frequency Division Multiplexing (OFDM) symbols with different Transmission Configuration Indication (TCI) states.

19. A method, comprising:
receiving a capability report from a device, wherein the capability report comprises Physical Downlink Control Channel (PDCCH) monitoring capability and/or beam switching capability of the device;
generating PDCCH transmission parameters, based on the capability report, for transmitting a Downlink Control Information (DCI) with a plurality of PDCCH transmissions with span level repetitions;
configuring, based on the PDCCH transmission parameters, a plurality of resources for transmitting the DCI and a search space set for DCI detection in a PDCCH monitoring occasion set; and
transmitting the DCI in a plurality of DCI versions with the plurality of PDCCH transmissions using the plurality of resources.

20. The method of claim 19, wherein the PDCCH transmission parameters comprise a total repetition number of the PDCCH transmissions.

* * * * *